United States Patent
Hillenbrand et al.

(10) Patent No.: US 11,630,306 B2
(45) Date of Patent: Apr. 18, 2023

(54) SMARTGLASSES, LENS FOR SMARTGLASSES AND METHOD FOR GENERATING AN IMAGE ON THE RETINA

(71) Applicant: tooz technologies GmbH, Aalen (DE)

(72) Inventors: Matthias Hillenbrand, Jena (DE); Norbert Kerwien, Mögglingen (DE)

(73) Assignee: tooz technologies GmbH, Aalen (DE)

( * ) Notice: Subject to any disclaimer, the term of this patent is extended or adjusted under 35 U.S.C. 154(b) by 651 days.

(21) Appl. No.: 16/470,193

(22) PCT Filed: Dec. 11, 2017

(86) PCT No.: PCT/EP2017/082198
§ 371 (c)(1),
(2) Date: Jun. 14, 2019

(87) PCT Pub. No.: WO2018/108800
PCT Pub. Date: Jun. 21, 2018

(65) Prior Publication Data
US 2020/0018964 A1    Jan. 16, 2020

(30) Foreign Application Priority Data

Dec. 15, 2016 (DE) .......................... 102016124538.0

(51) Int. Cl.
G02B 27/01 (2006.01)
G02B 27/18 (2006.01)
(Continued)

(52) U.S. Cl.
CPC ......... *G02B 27/0172* (2013.01); *G02B 27/18* (2013.01); *G02C 7/02* (2013.01);
(Continued)

(58) Field of Classification Search
CPC ................ G02B 27/0172; G02B 27/18; G02B 2027/0174; G02B 2027/0178; G02C 7/02; G03H 1/0248; G03H 1/22; G03H 2270/55
See application file for complete search history.

(56) References Cited

U.S. PATENT DOCUMENTS 5,579,161 A    11/1996 Sekiguchi
6,452,699 B1    9/2002 Athale et al.
(Continued)

FOREIGN PATENT DOCUMENTS

DE    19758395 C2    7/1999
JP    05210069 A    8/1993
(Continued)

OTHER PUBLICATIONS

International Preliminary Report on Patentability rendered by the International Bureau of WIPO for PCT/EP2017/082198, dated Jun. 18, 2019, 8 pages.
(Continued)

*Primary Examiner* — Darryl J Collins
*Assistant Examiner* — Matthew Y Lee
(74) *Attorney, Agent, or Firm* — Skaar Ulbrich Macari, P.A.

(57) ABSTRACT

A spectacle lens for smartglasses can include at least one light source arrangement at the edge of the spectacle lens that emits coherent light, or at least one region at the edge of the spectacle lens for coupling in light from a light source arrangement that emits coherent light, or at least one light source arrangement that is embedded in the spectacle lens. A transparent or partly transparent display can provided to the spectacle lens such that coherent light emanating from the light source arrangement emits coherent light passing through the display or is reflected by the display. The
(Continued)

wavefront of the coherent light is modulable in terms of its amplitude and/or its phase by an actuation of the display. A deformation device for deforming the wavefront of the coherent light before or after the modulation by the display can also be provided.

27 Claims, 6 Drawing Sheets

(51) Int. Cl.
    *G02C 7/02*     (2006.01)
    *G03H 1/02*     (2006.01)
    *G03H 1/22*     (2006.01)

(52) U.S. Cl.
    CPC ............ *G03H 1/0248* (2013.01); *G03H 1/22* (2013.01); *G02B 2027/0174* (2013.01); *G02B 2027/0178* (2013.01); *G03H 2270/55* (2013.01)

(56) References Cited

U.S. PATENT DOCUMENTS

| | | | |
|---|---|---|---|
| 6,961,159 B2 | 11/2005 | Yamauchi et al. | |
| 8,441,731 B2 | 5/2013 | Sprague | |
| 10,690,915 B2 | 6/2020 | Popovich et al. | |
| 2004/0246588 A1 | 12/2004 | Grego | |
| 2008/0192045 A1 | 8/2008 | Brandt et al. | |
| 2009/0103151 A1 | 4/2009 | Horikawa | |
| 2009/0122385 A1 | 5/2009 | Hilton | |
| 2009/0219380 A1 | 9/2009 | Cable | |
| 2013/0106847 A1 | 5/2013 | Sugiyama et al. | |
| 2014/0104665 A1* | 4/2014 | Popovich | G02B 5/32 |
| | | | 359/15 |
| 2014/0118829 A1* | 5/2014 | Ma | G02B 5/1885 |
| | | | 359/630 |
| 2014/0146133 A1 | 5/2014 | Nikonov et al. | |
| 2015/0268467 A1 | 9/2015 | Cakmakci et al. | |
| 2016/0195720 A1* | 7/2016 | Travis | G03H 1/2205 |
| | | | 359/19 |
| 2016/0209656 A1 | 7/2016 | Urey | |
| 2016/0299344 A1 | 10/2016 | Dobschal et al. | |
| 2016/0306171 A1 | 10/2016 | Rudolph et al. | |
| 2017/0185037 A1* | 6/2017 | Lee | G03H 1/2294 |
| 2017/0299870 A1* | 10/2017 | Urey | G03H 1/2202 |
| 2019/0004322 A1* | 1/2019 | Alexander | H04N 9/3129 |

FOREIGN PATENT DOCUMENTS

| | | |
|---|---|---|
| WO | 2013163347 A1 | 10/2013 |
| WO | 2014155288 A2 | 10/2014 |
| WO | 2016105281 A1 | 6/2016 |

OTHER PUBLICATIONS

Office Action to the corresponding Chinese Patent Application No. 201780076587.6 rendered by the China National Intellectual Property Administration dated Apr. 6, 2021, 22 pages (including English translation).

Reichelt, Stephan, et al.; Holographic 3-D Displays—Electroholography within the Grasp of Commercialization; Advances in Lasers and Electro Optics, Apr. 2010, 30 pages.

The International Search Report and Written Opinion rendered by the International Searching Authority for PCT/EP2017/082198, dated Mar. 21, 2018, 16 pages.

Search Report by the German Patent Office for the German priority application No. 10 2016 124 538.0, dated Sep. 19, 2017, 28 pages.

\* cited by examiner

SMARTGLASSES, LENS FOR SMARTGLASSES AND METHOD FOR GENERATING AN IMAGE ON THE RETINA

PRIORITY

This application claims the benefit of German Patent Application No. 10 2016 124 538.0, filed on Dec. 15, 2016, and which is hereby incorporated herein by reference in its entirety.

FIELD

The invention relates to smartglasses, which provide the human eye with a two-dimensional image information item on the retina. Additionally, the invention relates to a spectacle lens for such smartglasses and a method for generating a picture on the retina of a person wearing smartglasses.

BACKGROUND

An image information item on the retina can be generated in multifaceted ways. Both scanning and non-scanning systems are conventional. In scanning systems, the perceived picture is generated by virtue of both the position and the strength of a virtually punctiform intensity distribution on the retina being modulated in time. An example of a scanning system is described in WO 2014/155288 A2. In non-scanning systems, the pixels of an extended display are imaged simultaneously onto the retina. To this end, the display and retina must be in planes that are optically conjugate to one another.

It is often desirable to admit the undisturbed view of the surroundings in addition to the provision of an additional image information item (see-through wearables). This requirement prevents solutions in which a non-transparent image generator and an associated imaging optical unit are arranged directly in front of the eye. Therefore, the image information item is usually generated outside of the field of view of the eye and the generated picture is mirrored into the desired viewing direction in front of the eye with the aid of an optical unit. Here, the outlay for the provision of the additional image information items increases disproportionately with the size of the image field in which the image information items are provided. The size of the maximum visual field that can be provided is often restricted by physical laws of image production or by mechanical, ergonomic or esthetic restrictions in the design of the smartglasses. By way of example, restrictions as a result of physical laws may be given by the limit angle for total-internal reflexion if the imaging beam path from an image generator arranged in the spectacle earpiece, for example, is guided through the spectacle lens by means of total-internal reflection to an output coupling structure, arranged in the spectacle lens, for coupling out the imaging beam path in the direction of the eye. An example of smartglasses in which the imaging beam path is guided by means of total-internal reflection to an output coupling structure in the spectacle lens is described in DE 10 2013 223 963 A1 and DE 10 2013 223 964 B3, for example. Mechanical, ergonomic or esthetic restrictions may be given for example by available installation space, the weight of the components or the acceptance of certain designs by the user.

Systems in which a partly transparent image generator is embedded directly into the spectacle lens come into question as a solution for smartglasses that facilitate larger fields of view for the overlaid image information item. However, for the purposes of imaging the image information item presented on the image generator onto the retina of the eye of a user, it is necessary for the image generator and the retina to lie in optically conjugate planes. Usually, a spectacle lens is situated at a distance of 10 to 30 mm from the eye and therefore lies outside the clear visual range of a person with normal vision. Expressed differently, the eye of persons with normal vision cannot adapt the lens focal length in such a way that the picture represented on the image generator can be seen in focus. An additional contact lens, which allows the wearer to focus on the spectacle lens, is necessary in such cases, as described in U.S. Pat. No. 8,441,731 B2, for example. However, the contact lens reduces the ergonomics and it is generally linked to problems with the acceptance thereof and medical concerns.

Imaging on the basis of coherent image transforms represents a way out. This type of imaging renders it possible to arrange the display outside of a plane that is optically conjugate to the retina and nevertheless be able to generate a picture on the retina. What is exploited here is that the radiant flux density distribution on the retina is formed by a coherent addition of the wavefronts respectively emanating from the individual pixels of the image generator. This coherent addition can be described mathematically by way of a diffraction integral. Provided the optical system has a moderate numerical aperture, a so-called scalar approximation can be applied, in which the diffraction integrals can be calculated approximately. The so-called Fourier approximation, which states that the Fourier transform of a complex amplitude distribution of the wavefront can be observed in the far field or in the focal plane of an ideal lens, is widespread. Expressed differently, if the observer observes a complex amplitude distribution, i.e., the distribution of amplitude and phase, arranged in the focal plane of the lens, said complex amplitude distribution being given by a two-dimensional picture, said observer sees the Fourier transform of this picture. Since the optical relationships that describe this behavior are reversible, it is also possible to display a Fourier distribution representing the Fourier transform of the picture in the focal plane instead of a complex amplitude distribution that represents the picture itself. In this case, the two-dimensional picture is presented on the retina. Such methods are described, for example, in Stijns "Basic demonstrations in diffractive and Fourier optics: use your eye as Fourier transformer.", Proc. SPIE 3190, 1997, pages 368-378 or in WO 02/091061 A1.

There already are approaches in which the described principle of Fourier optics is used in conjunction with spectacles. DE 197 58 395 C2, U.S. Pat. No. 6,452,699 B1 and U.S. Pat. No. 6,961,159 B2 present static spectacle systems, in which a fixed diffraction pattern is produced, for example by way of a diffractive optical element (DOE) integrated in the spectacle. In US 2009/103151 A1 and US 2009/219380 A1, an intermediate image is produced on a diffusion screen by way of a dynamic image generator. This intermediate image is observed by the human eye. In U.S. Pat. No. 5,579,161, a modulable image generator is positioned in front of the eye together with a stretched imaging system, which contains a plurality of rotationally symmetric lens elements. US 2008/192045 A1 describes a head-up display having a coherent image generator. US 2013/106847 A1 presents methods for increasing the data rate and for improving the contrast of smartglasses that are based on the Fourier transform principle. Here, the image generated is arranged in the earpiece of smartglasses. The image information item is provided for the user by way of a deflection element arranged in front of their eye. WO 02/091061 A1, too, describes smartglasses that are based on the Fourier transform principle. However, in contrast to the smartglasses from US 2013/106847 A1, the image generator is integrated into the spectacle lens.

US 2014/0146133 has disclosed a transparent holographic display.

WO 2014/209244 A1 has disclosed smartglasses in which an image generator, on which a picture to be displayed on the retina is shown, is arranged outside of a plane that is conjugate to the retina. In order nevertheless to be able to generate an image of the picture shown on the image generator on the retina, the principle of the pinhole camera is resorted to. In the process, a spatial light modulator (SLM) is arranged in front of the eye, said spatial light modulator being illuminated from the spectacle earpiece by means of a point light source. The light passing through the modulator is reflected back in the direction of the eye by a matrix made of microreflectors, which are arranged on the back side of the modulator.

However, the presented solutions are only usable to restricted extent in smartglasses with a partly transparent display (see-through display) integrated in the spectacle lens:

- If the coherent image generator is arranged outside of the field of view, the same difficulties in guiding the image to the eye as exist in the above-described conventional imaging systems and the scanning systems, for instance installation space problems, arise in the case of an increase in the field of view.
- There is a lower limit for the pixel sizes that are achievable with current coherent light modulators. Typical pixel dimensions are currently at 5 μm, or thereabove. This leads to a limitation of the deflection angles that are achievable with the light modulator—and consequently to a limitation of the field and also of the achievable eyebox. Here, the eyebox is that three-dimensional region of the light tube in the imaging beam path in which the eye pupil can move, without vignetting of the image taking place. Since, in the case of smartglasses, the distance of the eye with respect to the smartglasses is substantially constant, the eyebox can be reduced to a two-dimensional eyebox that only takes account of the rotational movements of the eye. In this case, the eyebox substantially corresponds to the exit pupil of the smartglasses at the location of the entrance pupil of the eye. The latter is generally given by the pupil of the eye. It should be noted in respect of the eyebox that larger fields of view make a stronger rotation of the eye necessary in order to image the necessary image information items on the central retina, i.e., the point of sharpest vision.

SUMMARY

An object herein is to provide an advantageous spectacle lens for smartglasses and advantageous smartglasses. Moreover, it is an object herein to provide an advantageous method for generating a picture on the retina of a person wearing smartglasses.

A spectacle lens for smartglasses can comprise:
at least one light source arrangement that is arranged at the edge of the spectacle lens and that emits coherent light, or at least one region, arranged at the edge of the spectacle lens, for coupling in light from a light source arrangement that emits coherent light, or at least one light source arrangement that is embedded in the spectacle lens. The light source arrangement may comprise at least one primary light source and/or at least one secondary light source. Here, a primary light source should be considered to be a self-luminous light source, such as, for example, an incandescent lamp, a luminescence emitter, a laser, etc. A secondary light source should be considered to be a light source that is not itself luminous, for instance the output end of an optical fiber. Here, the light source arrangement or the region for coupling in the light is arranged at the edge of the spectacle lens. However, there alternatively is also the option of embedding the light source arrangement into the spectacle lens, for example in the form of a so-called phased array, i.e., a two-dimensional arrangement of light sources with a fixed or at least known phase relationship. Here, coherent light should not only be considered to be highly coherent light, such as laser light, for example, but any light that has a sufficient coherence length for generating the image on the retina and a sufficient spatial coherence. By way of example, spatially coherent light can also be produced with the aid of a conventional incandescent lamp or with the aid of a luminescence emitter by virtue of the light emanating from the incandescent lamp or the luminescence emitter being stopped-down by means of a pinhole. Then, the aperture can be considered to be an approximately punctiform secondary light source. Point light sources have a high spatial coherence. Here, the extent of the spatial coherence can be determined by the size of the hole of the pinhole. Temporal coherence can be achieved by restricting the emission spectrum by means of a spectral filter or an interference filter.

A transparent or partly transparent display which is arranged on or in the spectacle lens in such a way that coherent light emanating from the light source arrangement that emits coherent light passes through the display or is reflected by the display. Moreover, the display is embodied in such a way that the wavefront of the coherent light is modulable in terms of its amplitude and/or its phase by an appropriate actuation of the display. Here, the transparent or partly transparent display can be applied to a surface of the spectacle lens or it can be embedded in the spectacle lens.

A deformation device for deforming the wavefront of the coherent light before or after the modulation by the display. By way of example, the deformation device can be arranged on a surface of the spectacle lens, for instance on the surface facing away from the eye when the display is arranged on the surface facing the eye, or vice versa. If the display is embedded into the spectacle lens, the deformation device can be arranged either on the spectacle lens surface facing the eye or on the spectacle lens surface facing away from the eye. Moreover, it is possible to embed both the display and the deformation device into the spectacle lens. Here, the deformation device can be arranged, once again, on the side facing the eye or on the side of the display facing away from the eye. Two deformation devices may also be present in all cases, with one deformation device being arranged on the side facing the eye and one being arranged on the side of the display facing away from the eye.

The spectacle lens uses coherent radiation that is produced outside or at the edge of the visual region of the spectacle lens used to look through and coupled into the spectacle lens. If need be, appropriate auxiliary optical units are present for coupling the coherent radiation into the spectacle lens, for instance in the form of refractive, diffractive or holographic elements. However, it is also possible to arrange light sources such as laser diodes, for example, directly on the spectacle lens. If reference is made to the arrangement of the input coupling region or the light source at the edge of the spectacle lens, the input coupling region or the light source can be arranged on a circumferential surface of the spectacle lens or on a surface facing the eye or facing away from the eye, provided the input coupling region or the light source lies at the edge of the region used to look through or outside of the region of the spectacle lens used to look through.

The method for generating a picture on the retina of a person wearing smartglasses can be realized by smartglasses that have a spectacle lens according to the invention. The picture can be produced by virtue of a picture to be generated on the retina being specified, a wavefront at the location of the retina that leads to the picture to be generated on the retina being ascertained, the display being positioned outside of a plane that is optically conjugate to the retina of the person wearing the smartglasses, a wavefront immediately behind the display been ascertained by backward propagation of the wavefront at the location of the retina, the display being actuated in such a way that the wavefront of the coherent light emanating from the light source arrangement that emits coherent light is modulated such that a wavefront corresponding to the wavefront ascertained by backward propagation of the wavefront at the location of the retina arises immediately behind the display, and the wavefront of the illumination light, by means of which the pixels of the display are illuminated, being set by a deformation of the wavefront of the coherent light by means of the deformation device in such a way that a light cone emanating from a pixel is directed to a point on or in the eye, or a light cone emanating from a pixel being deflected in the direction of a point on or in the eye, for example on the pupil center, the center of rotation of the eye or a point between these two points of at least one eye looking straight ahead, by a deformation of the wavefront of the coherent light by means of the deformation device.

Here, the pixels of the display represent a diffractive structure, said pixels modifying and deflecting the incident wavefront. What can be achieved by the deflection by means of the deformation device is that a light cone of the wavefront, emanating from a pixel, is directed in the direction of a point on or in an eye that has optimal positioning in relation to the spectacle lens. Here, the deflection angle may also have the value of zero for some pixels. In principle, a deformation of the wavefront is also possible both prior to incidence on the display and after the passage through the display or after the reflection on the display. However, two deformation devices are required to this end. If reference within the scope of the present invention is made to the light cone being directed to a point on or in the eye or being deflected in the direction of the pupil center or the center of rotation of the eye, this should mean that at least a portion of the light cone is incident on this point.

Nevertheless, a light cone may miss the pupil center or the center of rotation of the eye, and so the whole image information item may not be perceived, if the eye is not looking straight ahead or if there is an offset of the eye in relation to the optimal position of the spectacle lens. However, the perception of the entire image information item can largely be ensured in one advantageous configuration of the invention by virtue of the transparent or partly transparent display having groups of display subregions, wherein the display subregions of the individual groups are arranged over the display with an alternating lateral distribution and each group of display subregions generates the same picture. Then, the deformation device for deforming the wavefront of the coherent light before or after the modulation comprises groups of deformation device subregions that are arranged over the deformation device with an alternating lateral distribution, wherein each of the groups of deformation device subregions is associated with a group of display subregions and wherein the various groups of deformation device subregions deform the wavefront in such a different way that the light cones of adjacent display subregions, representing the same image information item, of different groups of display subregions are directed to different points in space. Then, the groups of deformation device subregions can be optimized for different eye positions or different viewing directions in such a way that the light cones emanating from different groups of display subregions generate the light cone directions suitable for reaching the eye pupil or the center of rotation of the eye for the respective eye position or viewing direction. In this way, the user can in each case at least perceive the light cones emanating from one of the groups of display subregions for a multiplicity of eye positions and viewing directions, and so said user receives the image information item of the display in each of the eye positions and viewing directions. As a result of this, a large eyebox is realizable. What can also be achieved if the groups of display subregions and deformation device subregions are suitably configured is that more than one group of display subregions contributes in each case to the image generation on the retina at the same time in every eye position or viewing direction, as a result of which unwanted intensity variations in the case of coherent illumination, so-called speckles, can be reduced.

The same effect can also be obtained if the deformation device for deforming the wavefront of the coherent light has a number of deformation layers before or after the modulation instead of the various groups of deformation device subregions, wherein each deformation layer is associated with one of the groups of display subregions. Expressed differently, the deformation device does not have a lateral segmentation in this variant but instead has a plurality of layers lying in succession, which each illuminate the entire display. In this case, the display subregions not associated with the respective deformation layer would deflect the light component incident thereon in the wrong direction, and so the latter does not reach the eye.

Moreover, for the purposes of obtaining the same effect, a spectacle lens with a number of display layers also can be used instead of a spectacle lens with a segmented display, in which spectacle lens with a number of display layers the wavefronts arising behind the display layer are adapted to different viewing angles or different values of the offset of the eye in each case, wherein the deformation device of the spectacle lens for deforming the wavefront of the coherent light before or after the modulation has a number of deformation layers, which are each associated with one of the display layers. Here, slightly different wavelengths can find use to separate the information paths, depending on the display and associated deformation device.

The same effect can also be obtained by virtue of the actuation of the display being implemented in such a way that the wavefront arising behind the display has light cones that are each inclined in a specified direction. Here, the specified direction can vary in time in a first alternative or, in a second alternative, the viewing direction of the eye can be captured and the specified direction can be matched to the viewing direction of the eye. By way of example, in the first alternative, the temporal variation can be implemented in such a way that a number of specified directions are run through in cyclical fashion. Here, each of the specified directions is matched to a certain viewing angle or an offset of the eye, and so pictures can be generated for a number of viewing angles or for different values of the offset of the eye by way of the directions run through in cyclical fashion. Here, the images being run through in cyclical fashion should be implemented at a sufficiently high speed so that no flickering of the perceived image arises.

A picture can be generated on the retina by modulating the wavefront in the focal plane of the lens of the eye using the spectacle lens with the achievable field of view not being restricted by guiding an imaging beam path emanating from an image generator arranged outside of the spectacle lens to an output coupling structure through the spectacle lens. Moreover, the field angle for the imaging can be increased with the aid of the deformation of the wavefront by the deformation device, without the pixels of the image generator having to be reduced to this end. Moreover, the deformation of the wavefront by the deformation device also renders it possible to compensate refractive errors of the eye of a person using smartglasses with a spectacle lens according to the invention by way of a suitable deformation of the wavefront. Expressed differently, user-specific visual defects and corresponding correction surfaces in the spectacle lens can be taken into account when actuating the display for producing the modulation of the wavefront.

Particularly if the spectacle lens has a spectacle lens curvature, the transparent or partly transparent display may have a display curvature that is matched to the spectacle lens curvature.

The transparent or partly transparent display can be constructed, in full or in part, from optically transparent materials. Here, the electronics and/or the contacting and/or optically effective components can be constructed in transparent fashion. If the display is a transparent display, all components are constructed from transparent materials. By contrast, if the display is a partly transparent display, it has non-transparent regions, for instance regions of the electronics or of the contacting, with the dimensions of these non-transparent regions being smaller than the minimum pupil diameter of the eye, in particular smaller than 0.5 mm and preferably smaller than 0.1 mm. Then, the non-transparent regions are separated from one another by transparent regions. As a result of the non-transparent regions being smaller than the minimum pupil diameter of the eye and said regions lying outside of a plane that is optically conjugate to the retina, the observer can continue to perceive the surroundings through the display.

So as not to allow the deformation of the wavefront required for the enlargement of the perceivable field become too large, it is advantageous if the pixels of the transparent or partly transparent display have dimensions of no more than 7.5 µm, preferably of no more than 5 µm. Field angles of +/−2.03° can be realized without the deformation of the wavefront in the case of pixel dimensions of 7.5 µm; field angles of +/−3.05° can be realized in the case of pixel diameters of 5 µm. Since a light cone with a maximum aperture of 6.1° consequently emanates from each pixel, light cones that emanate from pixels at the edge of the visual field may miss the pupil. However, as a result of the deformation of the wavefront, there is an illumination within the scope of the present invention with an illumination angle that leads to the light cones emanating from the display being directed to a point on or in the eye, for example on the pupil center or the center of rotation of the eye, or to the light cones emanating from the display being deflected in such a way that they are deflected in the direction of a point on or in the eye, for example in the direction of the pupil center or the center of rotation of the eye.

For the purposes of generating a polychromatic image on the retina, the light source arrangement that emits coherent light can comprise at least two light sources, preferably at least three light sources, with different emission wavelengths or a light source that is tunable in terms of its emission wavelength or a light source that simultaneously emits in a plurality of emission wavelengths, i.e., a multi-spectral light source such as, for instance, a laser emitting in a plurality of wavelengths or a white light source. For the purposes of coupling in coherent light with a plurality of emission wavelengths, the spectacle lens may comprise a device for coupling in the individual emission wavelengths in time-sequential fashion. Alternatively, it may comprise a device for coupling in the individual emission wavelengths in parallel. In the case of coupling in the individual emission wavelengths in parallel, the deformation device for deforming the wavefront of the coherent light can have at least two, preferably at least three deformation layers, which each bring about a deformation of the wavefront in different emission wavelengths, or the deformation device is subdivided into at least two, preferably at least three deformation segment groups, wherein the segments of a deformation segment group differ from the segments of the respective other deformation segment groups in that they bring about a deformation of the wavefront in the different emission wavelengths, and wherein the segments of the deformation segment groups are distributed in alternating lateral fashion in the deformation device.

If the deformation device for deforming the wavefront of the coherent light is configured in such a way that the deformation of the wavefront is implemented before the modulation by the display, the deformation device may comprise at least one of the following elements: a ply with a holographic optical element (HOE), optionally a segmented holographic optical element, a partly transmissive beam splitter layer, a dichroic beam splitter layer, a ply with a partly transparent Fresnel mirror, a gradient index layer, abbreviated as GRIN.

If the deformation device for deforming the wavefront of the coherent light is configured in such a way that the deformation of the wavefront is implemented after the modulation by the display, the deformation device may comprise at least one of the following elements: a ply with a holographic optical film, optionally with a segmented holographic optical film, a ply with microprisms, a ply with Fresnel structures, a gradient index layer.

It is also possible for the pixels of the display to be illuminated with convergent or divergent radiation or for the illumination angles to be switched over in dynamic fashion. In both cases, the illumination already spans an angular range that can additionally be modified by the display. As result of this, it is possible to generate significantly larger light cones and consequently also possible to enlarge the realizable eyebox and the presentable field. Therefore, a spectacle lens according to the invention may moreover comprise an optical arrangement for producing a divergent or convergent beam path. In particular, such an arrangement may be equipped with converging and/or diverging lens elements. As an alternative, the spectacle lens may comprise an optical arrangement for dynamically switching the illumination angle at which the display is illuminated.

Moreover, the spectacle lens may comprise a polarization arrangement for polarizing the coherent light emanating from the light source arrangement that emits coherent light. Like the arrangement for producing a divergent or convergent beam path or the arrangement for dynamically switching the illumination angle, the polarization arrangement may be part of the light source arrangement.

Smartglasses can be equipped with a spectacle lens as provided herein and, provided the light source arrangement is not part of the spectacle lens, with a light source arrangement. The advantages to be obtained by means of the smartglasses emerge from the use of the spectacle lens. Therefore, reference is made to the explanations relating to the spectacle lens, which apply accordingly to the smartglasses.

Provided the smartglasses comprise a light source arrangement that emits coherent light, said light source arrangement not being part of the spectacle lens, the light source arrangement can comprise an arrangement for producing a divergent or a convergent beam path or an optical arrangement for dynamically switching the illumination angle. Likewise, the smartglasses may comprise a polarization arrangement for polarizing the coherent light emanating from the light source arrangement that emits coherent light.

Moreover, the smartglasses may comprise a light source arrangement that emits coherent light comprising at least two, preferably three light sources with different emission wavelengths or a light source that is tunable in terms of its emission wavelength or a light source that simultaneously emits in a plurality of emission wavelengths, i.e., a multispectral light source such as, for instance, a laser emitting in a plurality of wavelengths or a white light source.

Further features, properties and advantages of the present invention will become apparent from the following description of exemplary embodiments with reference to the accompanying figures.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
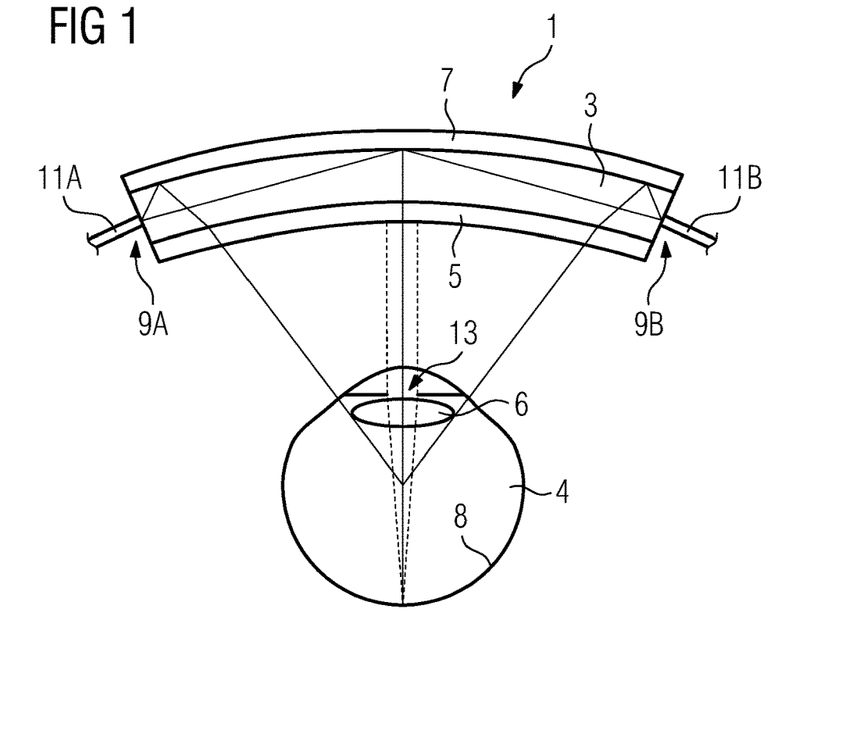
FIG. 1 shows a first exemplary embodiment of a spectacle lens according to the invention in a schematic illustration.

A first exemplary embodiment for a spectacle lens according to the invention, which may find use in smartglasses according to the invention, and developments of this exemplary embodiment are described below with reference to FIGS. 1 to 7. Here, FIG. 1 shows, in a schematic illustration, the structure of the spectacle lens together with the eye of a user of smartglasses according to the invention that are equipped with the spectacle lens.

The spectacle lens 1 comprises a spectacle lens main body 3, which may be produced from a mineral or organic glass. A display 5 is arranged on the inner surface of the main body 3 that faces the eye, said display allowing the complex amplitude distribution of the wavefront of coherent illumination light illuminating the display 5 to be modulated. A deformation device 7, by means of which it is possible to deform the wavefront of the coherent light that illuminates the display 5, is situated on the outer surface of the main body 3 that faces away from the eye 4.

Regions 9A, 9B for coupling coherent light into the main body 3 are situated on the lateral edges of the main body 3. The coherent light is provided by the output ends of optical fibers 11A; 11B in the present exemplary embodiment, said optical fibers being arranged in such a way that the light emitted thereby is emitted in the direction of the deformation device 7. Here, the optical fiber 11A in the input coupling region 9A, illustrated to the left in FIG. 1, substantially serves to illuminate the left half of the deformation device 7 and the optical fiber 11B in the input coupling region 9B, illustrated to the right in FIG. 1, substantially serves to illuminate the right side of the deformation device 7.

In the present exemplary embodiment, the coherent light is reflected under deformation of the wavefront in the direction of the display 5 by the deformation device 7. A pattern that modulates the phase and/or the amplitude of the wavefront incident on the display in such a way that a wavefront that can approximately be described by the Fourier transform of a picture to be presented on the retina 8 is present immediately behind the display is illustrated on the display 5. The spectacle lens is then arranged in front of the eye 4 by means of the smartglasses according to the invention in such a way that the display 5 is situated at a distance from the lens of the eye 6, said distance corresponding to a focal length that is adaptable by the lens of the eye 6. As a result, the wavefront is situated in a focal plane of the lens, leading to the lens approximately serving as a Fourier transformer, which in turn leads to the beam reaching the retina 8 generating, by way of interferences, an intensity distribution on the retina 8 that corresponds to the picture to be presented.

Since merely deflections of the wavefront of the order of approximately +/−3° are possible with the currently conventional pixel dimensions of transparent or partly transparent displays, the maximum visual field achievable with the display 5 on its own would be very small. The deformation device 7, which can bring about a tilt of the illuminating wavefront, serves to increase the visual field. Here, the degree of the tilt depends on the local surface form of the deformation device and on the location of incidence of the wavefront on the deformation device, and so it is possible to realize a tilt distribution that is adapted to the point of incidence of the wavefront on the display. Such a tilt distribution is suitable for increasing the representable image angle, as will still be described below.

All that was discussed up until now was the basic construction and the functional principle of the first exemplary embodiment of the spectacle lens 1 according to the invention. Possible configurations of the individual components are described below.

Figure 9:
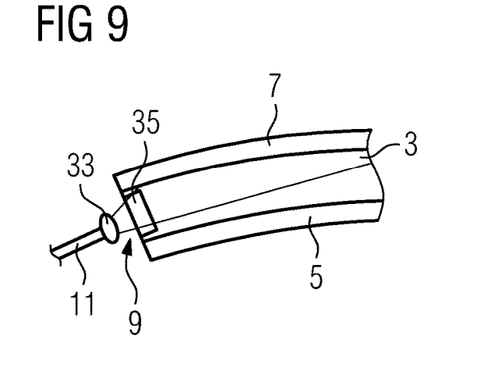
FIG. 9 shows a variant of the spectacle lens having an optical component for producing a divergent beam path and a polarizer.

Coherent light or partly coherent light is used to irradiate the display 5 in the spectacle lens 1 of the first exemplary embodiment, just like in the spectacle lenses of the exemplary embodiments to be described below. Here, the term coherence subsumes both the temporal coherence linked to the spectral bandwidth of the radiation and the spatial coherence in the case of the emission of a planar emitter. Even a broadband light source such as a white light source, for example, has a certain coherence length, i.e., a certain spatial coherence, and therefore it is considered to be a partly coherent light source below. In general, the spatial coherence of a typical white light source is low because a multiplicity of emissions occur at spatially separated points of the light source and the individual emission processes occur independently of one another. However, what can be achieved with the aid of a pinhole is that there is an increase in spatial coherence beyond the pinhole. As the diameter of the hole of the pinhole decreases, the spatial coherence beyond the pinhole increases. However, this also decreases the intensity of the illumination light. The temporal coherence of the white light source is substantially determined by the wavelength distribution of the emitted light. Light that is emitted by the light source with the same wavelength has temporal coherence. However, this is disturbed by the superposition with light of other wavelengths. The interference by other wavelengths can be reduced—and hence the temporal coherence can be increased—by using a narrowband filter. However, this is also accompanied by a reduction in the intensity. Therefore, the use of a laser diode or a laser, which emit sufficiently coherent light in terms of time and space owing to their concept, is advantageous within the scope of the exemplary embodiment. Even though a laser diode could in principle be arranged at the edge of the spectacle lens 1, for example, the light source 37 in the present exemplary embodiment, i.e., the laser or the laser diode, is situated in the spectacle frame (see FIG. 13) and the light emitted by the laser or the laser diode 37 is guided to the input coupling region 9 of the main body 3 of the spectacle lens 1 by means of an optical fiber 11. This offers the advantage of being able to implement input coupling at a plurality of points of the input coupling region 9 using a single light source 37 by virtue of a plurality of optical fibers being guided to different portions of the input coupling regions. Splitting the coherent radiation emitted by the light source among a plurality of fibers can be implemented by way of a 1-to-N fiber coupler, for example. However, it is also possible to use a plurality of laser diodes or other sources of coherent radiation that are fastened to the edge of the spectacle lens 1, for example. By way of example, other sources of coherent radiation would be vertical cavity surface emitting lasers (VCSELs). Moreover, there is also the option of embedding light guiding structures into the main body 3 and of, where need be, using auxiliary optical units for the input coupling even if direct input coupling without auxiliary optical units is possible in principle. By way of example, refractive elements such as, e.g., lens elements or Fresnel structures and structures with a varying refractive index (so-called GRIN structures), etc., are considered as auxiliary optical units. All that needs to be considered in all of the described variants of light sources and the type of input coupling is that the display 5 is sufficiently illuminated. The presence of auxiliary optical units for coupling the illumination radiation into the main body 3 is illustrated schematically in FIG. 9. Here, the auxiliary optical unit is symbolized as lens element 33 that is arranged in front of the output end of the optical fiber 11. FIG. 9 also shows very schematically the arrangement of a polarization-optical component as a polarization arrangement. In the present exemplary embodiment, the polarization-optical component is a polarizer 35 in the input coupling region 9 of the main body 3. Other polarization-optical components can also find use instead of the polarizer or in combination with the polarizer, for example lambda/2 plates.

If the deformation device 7 and the display 5 are only present in a certain region of the spectacle lens 1, it is also possible to guide the coherent light by means of light guiding structures into that region in which the deformation device 7 and the display 5 are present. Here, for example, guidance can be implemented by way of total-internal reflection at the outer and inner surface of the main body or by reflective layers on the outer surface and the inner surface of the main body 3. However, what should be noted in this case is that possible auxiliary means introduced for the light guidance or the beam shaping must not influence, or at least not substantially influence, the view through the spectacle lens 1.

A further possible light source that can find use in the spectacle lens according to the invention is a transparent or partly transparent phase-locked array of laser sources, for example of VCSELs. This array of laser sources can be applied directly behind the display 5. If the individual laser sources of the array are modulable, the phase-locked array of laser sources can also adopt the display function in addition to the light source function, and so light source and display 5 form one unit. It is sufficient for the transparency of the array of laser sources if small, non-transparent laser sources are surrounded by transparent regions. Here, the assumption is made that the spectacle lens 1 is seated relatively close to the eye pupil 13 and an object point observed through the spectacle lens 1 can be perceived if the non-transparent laser source does not completely shadow the light beam emanating from the object point and striking the pupil 13. This condition is satisfied if the lateral extent of the non-transparent laser source is smaller than the pupil diameter. This is typically the case if the extent of the laser source is no more than approximately 0.5 mm, preferably no more than 0.1 mm.

An important precondition for coherent imaging is represented by the interferability of the partial waves. This is closely connected to the polarization of the radiation incident on the display. Therefore, the polarization should already be taken into account when designing the system. In a preferred embodiment variant of the invention, the entire display is illuminated by coherent radiation with the same polarization direction. By way of example, when guiding light with the aid of fibers, use can be made of polarization-maintaining fibers.

If polychromatic, i.e. multicolored, image contents should be represented by the spectacle lens 1 according to the invention, use can be made of a plurality of light sources that emit in different wavelengths. However, it is additionally also possible to use tunable light sources or multi-spectral light sources such as a laser, for instance, which simultaneously amplifies a plurality of wavelengths. It is possible both to provide all wavelengths parallel in time and to switch through the individual wavelengths in time-sequential fashion. However, in the parallel provision of all wavelength the is necessary to optimize the image information item to be represented by the display in such a way that all wavelengths simultaneously represent the desired image information item by interference on the retina 8. Therefore, the time-sequential variation of the illumination wavelength in combination with synchronized switching of the wavefront provided by the display 5 is easier to realize. Moreover, the wavefronts can be optimized for the respective wavelength in the case of the time-sequential variation of the illumination wavelength.

Presented on the display 5 there is a pixel distribution by means of which the wavefront incident on the display 5 is modulated in such a way that a wavefront whose complex amplitude distribution can be ascertained at the location of the retina 8 by backward propagation of the wavefront and which can be approximated by the Fourier transform of the image to be represented on the retina 8 in the present exemplary embodiment arises directly behind the display 5. As a result of interference of the individual constituents of the wavefront on the retina 8, an intensity distribution which corresponds to the image to the represented arises there. As already mentioned, the display 5 need not be arranged in a plane that is optically conjugate to the retina 8 in this type of image production. The image arises from destructive and constructive superpositions of the partial waves emanating from the individual pixels of the display 5. In order to generate the desired intensity distribution on the retina 8, the wavefront emanating from the display 5 must have a fitting complex amplitude (intensity and phase distribution). This complex amplitude that is present immediately behind the display emerges from the input wavefront incident on the display 5 by multiplication by the wavefront modification by the display 5, i.e., by the pixelated amplitude and/or phase modification. During the propagation of the modified wavefront from the display 5 to the retina 8, said modified wavefront is influenced by the interposed optical layers and elements such as, for instance, the inner surface of the spectacle lens, the cornea, the lens of the eye 6 and the vitreous humor of the eye 4. The intensity pattern arising on the retina 8 can be determined with the aid of wave-optical propagation approaches such as Kirchhoff's diffraction integral, the Huygens-Fresnel principle, etc. In addition to the diffraction integrals, which describe the forward propagation from the display 5 to the retina 8, it is also possible to formulate inverse diffraction integrals which, from a specified intensity distribution on the retina 8, allow the calculation of the complex amplitude directly behind the display 5 that is necessary to this end. These diffraction integrals may either be solved directly or, as is often the case, these may only be solved approximately, as in the Fresnel approximation, or iteratively, for instance by means of iterative Fourier transform algorithms. User-specific visual defects and corresponding correction surfaces on the spectacle lens can be taken into account in the diffraction integral such that the pattern represented on the display 5 for influencing the wavefront already takes account of the visual defects. Smartglasses equipped with the spectacle lens 1 according to the invention can therefore be adapted by digital means to visual defects and individual wearing requirements of a user, for instance the position of the eyebox, the eye diameter, etc.

It is advantageous if the display 5 is adapted to the curvature of the spectacle lens 1 and able to modify both the intensity and the phase of the illumination wavefront even though, in principle, it also suffices if only the intensity or the phase of the illumination wavefront can be modified. In addition to the option of using a display that is adapted to the curvature of the spectacle lens 1, it is also possible to use a planar display.

Figure 12:
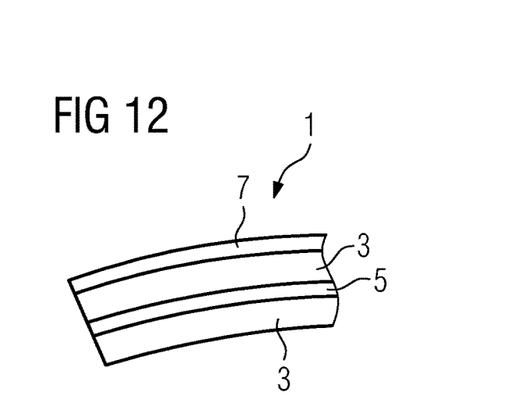
FIG. 12 shows a variant of the spectacles with a display embedded in the spectacle lens.

Like in the exemplary embodiment illustrated in FIG. 1, the display 5 can be arranged on the inner side of the main body 3. However, it is also possible to embed the display 5 into the main body 3, as illustrated in FIG. 12. Otherwise, the spectacle lens illustrated in FIG. 12 does not differ from the spectacle lens 1 illustrated in FIG. 1. Here, the display 5 can either be integrated into the spectacle lens 1 together with the associated electronics, or it can be subsequently combined with the spectacle lens and be adhesively bonded, for example.

As already mentioned, the intensity distribution on the retina 8 can be provided both by a display 5 with pure intensity modulation and by a display 5 with pure phase modulation. Both types of display are commercially available, for example in the form of liquid crystal displays (LCDs) or in the form of liquid crystals on a silicon substrate (LCoS). However, the greatest degrees of freedom when generating the intensity distribution on the retina 8 emerge from a display which modifies both the phase and the amplitude of the incident coherent wavefront. By way of example, such a display could be constructed as a multilayer display, in which one or more layers influence the phase and one or more layers influence the intensity of the incident wavefront. Such a display is described in WO 02/091061 A1, for example.

The spectacle lens according to the invention requires a transparent or partly transparent display 5. This can be implemented in two ways. On the one hand, transparent materials can find use for the electronics, the contacting and the optically effective components. On the other hand, there is the option of constructing the amplitude-modulating and/or phase-modulating structures from non-transparent materials and of connecting the non-transparent regions to one another by way of transparent zones/webs. In the case of a pixel dimension of $5 \times 5$ $\mu m^2$, for example, the eye automatically captures a multiplicity of transparent and non-transparent regions in each pupil position. Here, the degree of transparency emerges from the ratio between transparent and non-transparent regions. The degree of transparency correlates with the fill factor of the display and consequently influences the efficiency thereof.

As described, the intensity distribution at a certain point on the retina 8 emerges from the interference of those partial waves emanating from the display 5 that pass through the pupil of the eye 13. The pixels of the display 5 represent a diffractive structure which modifies and deflects the incident wave front of coherent light. The maximum deflection angle for the incident wavefront depends on the pixel dimensions of the display 5 in this case. By way of example, if an illumination light source with an emission wavelength of λ=532 nm is used, the illumination light in the form of a planar wavefront is incident on the display 5 parallel to the surface normal thereof and a line grating with a period p is presented on the display 5, this line grating acting as a diffraction grating with a period p. The angle of the first maximum then emerges from the equation sin β=m·λ/p, with m=1. A period of p=10 μm emerges in the case of a pixel dimension of 5 μm. From this, β=3.05° emerges as the angle of the first diffraction maximum in the case of the illumination wavelength of λ=532 nm. Hence, a visual field of only approximately +/−3° can be realized without further measures in the case of a pixel dimension of 5 μm. If a visual field of +/−30° is intended to be realized under the same preconditions in respect of the emission wavelength and the direction of incidence on the display 5, a period of 1.064 μm, and hence a pixel dimension of 0.532 μm, would be necessary to this end. Such small pixels cannot be produced with current technology.

Figure 2:
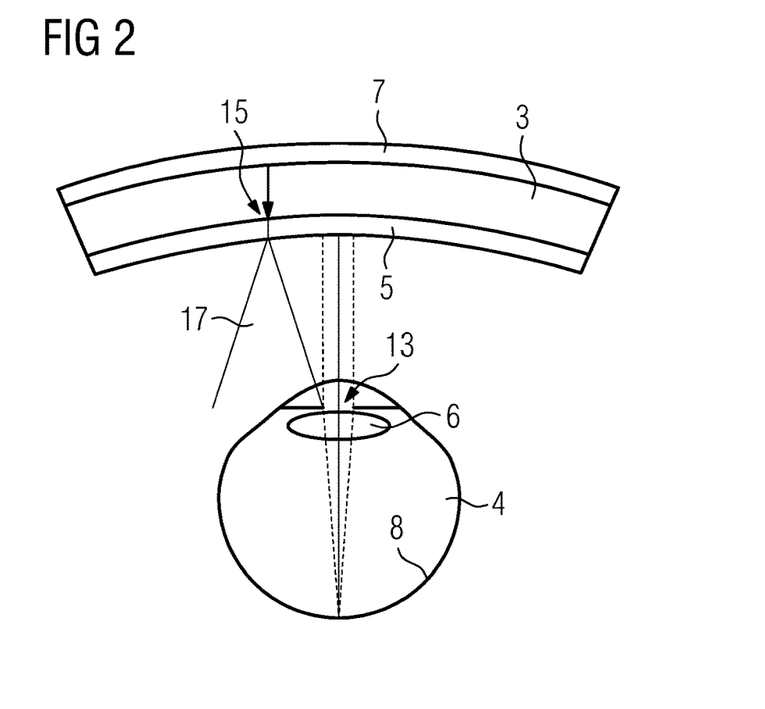
FIG. 2 shows an angle range that is realizable with the pixel dimensions of the display, wherein the angle range is illustrated in a display portion situated in the periphery.

On account of the small deflections of the wavefront that are realizable by means of the display 5, there is the risk of not the entire image information item reaching the retina 8 and hence of the image information item presented on the retina 8 being incomplete. The reason for this is that light cones 17 that are spanned by some subregions of the display 5 may miss the pupil 13 of the eye 4, as illustrated in FIG. 2. For a subregion 15 of the display 5, the figure shows the light cone 17 of the modulated wavefront emanating from this subregion 15. As may be identified from FIG. 2, the light cone 17 emanating from the subregion 15 completely misses the pupil 13 of the eye 4. Therefore, the information item presented on the subregion 15 of the display 5 does not reach the retina 8 of the eye 4 and therefore cannot contribute anything to the intensity distribution, representing the image to be presented, on the retina 8. In order to allow even the subregion 15 or the sub-wavefronts emanating from this subregion to reach the retina 8, the wavefront incident on the display 5 is deformed by means of the deformation device 7 in such a way that the part of the wavefront of the illumination light incident on the subregion 15 of the display 5 includes such an angle with the local surface normal of the display 5 in the region of the subregion 15 that the aperture cone emanating from the subregion 15 of the display is directed to the pupil 13, as illustrated in FIG. 3.

Figure 3:
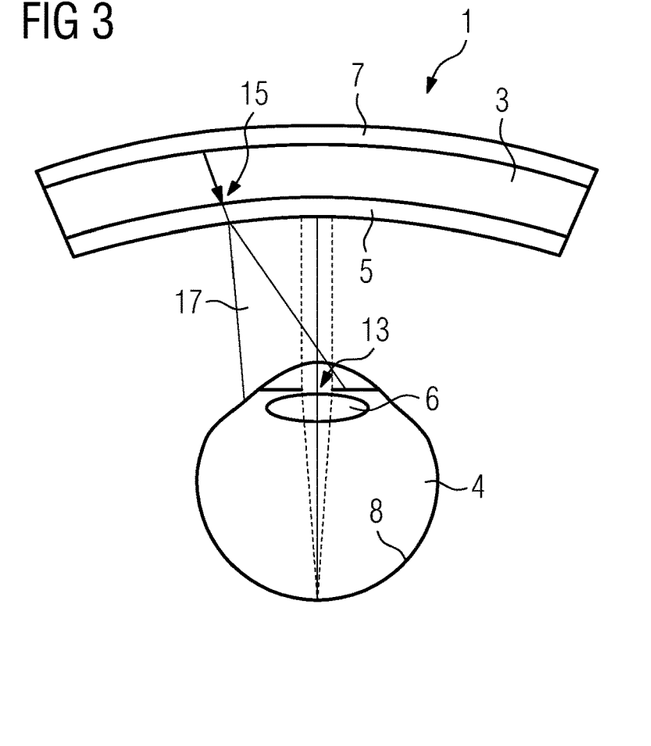
FIG. 3 shows the peripheral portion of the display of FIG. 2 with a different illumination direction.
Figure 4:
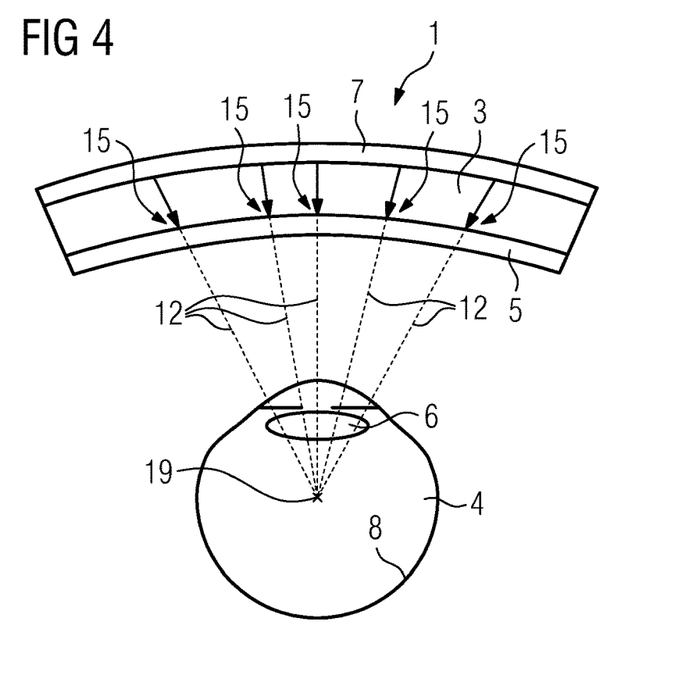
FIG. 4 shows the spectacle lens of FIGS. 2 and 3 with an illumination direction matched to the respective display portion.

In FIG. 3, the illumination wavefront is deformed by the deformation device 7 in such a way that the perpendicular of the light cone 17, which substantially corresponds to the direction of incidence of the wavefront of the illumination light on the display 5, points in the direction of the pupil 13. Therefore, what lends itself under the assumption of a rigid eye position is the deformation of the wavefront of the illumination light by means of the deformation device in such a way that the angle of incidence of the wavefront in relation to the local surface normal in each subregion has such a value that the perpendicular of the light cone 17 emanating from the display 5 points on the pupil 13 of the eye 4 for each subregion 15. By contrast, if an eye that can carry out a rotational movement is assumed instead of a rigid eye, it is advantageous if the wavefront of the illumination light is deformed by the deformation device in such a way that the perpendiculars 12 of the light cones 17 emanating from the subregions 15 of the display 5 intersect in the interior of the eye, in particular in the center of rotation of the eye 19, as illustrated in FIG. 4. In a special configuration of this variant, use can be made of concentric spectacle lenses, in which the center of curvature coincides with the center of rotation of the eye 19 of the eye. The perpendiculars 12 of the light cones 17 emanating from the subregions 15 of the display 5 may also intersect at a different point situated in the interior of the eye to the center of rotation of the eye 19, for example at a point situated between the center of rotation of the eye and the pupil center.

Figure 10:
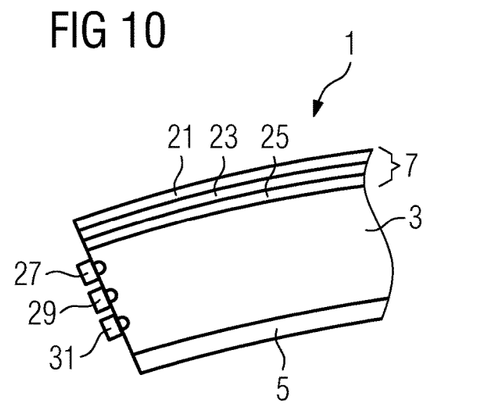
FIG. 10 shows a variant of the spectacle lens with laser diodes arranged on the spectacle lens and a three-layer deformation device.
Figure 11:
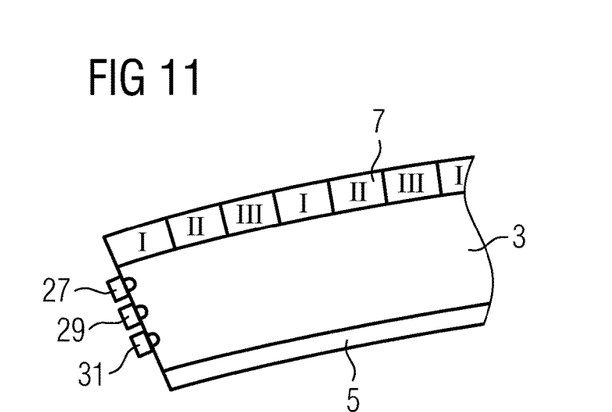
FIG. 11 shows a variant of the spectacle lens having three laser diodes and a deformation device, which is constructed from three elements with a lateral offset from one another.

In the present exemplary embodiment, a segmented holographic optical element (HOE) is used as a deformation device 7. In particular, this can be manufactured as a narrowband volume HOE operating in reflection. In this case, it has the peculiar property that it almost completely reflects the illumination radiation that has been coupled into the glass, while the greatest part of the visual spectrum can pass the holographic optical element almost without being influenced, and so the perception of the surroundings is virtually uninfluenced. Hence, the holographic optical element is an efficient, wavelength-selective beam splitter, which can be optimized specifically to the illumination wavelength. In the case of a polychromatic illumination with a plurality of narrow-bandwidth wavelength regions, the deformation device 7 may have a plurality of plies of holographic optical elements 21, 23, 25, each of which being optimized for one illumination wavelength. This is illustrated schematically in FIG. 10. Alternatively, there is also the option of arranging a plurality of sub-HOEs next to one another, as illustrated in exemplary fashion in FIG. 11 for three sub-HOEs I, II and III. It should be noted here that, deviating from FIG. 1, three laser diodes 27, 29, 31 that emit at different wavelengths are arranged directly on the main body 3 of the spectacle lens 1 in FIGS. 10 and 11. However, it is also possible to provide three optical fibers 11 or multiples thereof, with the optical fibers emitting illumination light into the main body 3 at three different wavelengths. However, alternatively, the illumination light in three different wavelengths can also be transmitted by way of a single optical fiber. The light guided through the optical fibers may either originate from light sources emitting at different wavelengths or from a tunable light source in this case. Here, the light at the different wavelengths can be coupled into the spectacle lens 1 either in parallel or in time-sequential fashion.

As an alternative to one or more HOEs, use may also be made of a conventional, partly transmissive beam splitter layer, one or more dichroic beam splitter layers, a partly transmissive Fresnel mirror or other beam splitter principles. Specific multiple output coupling principles, too, as described in U.S. Pat. No. 8,320,032 B2, for example, may find use for the illumination of the display.

Figure 5:
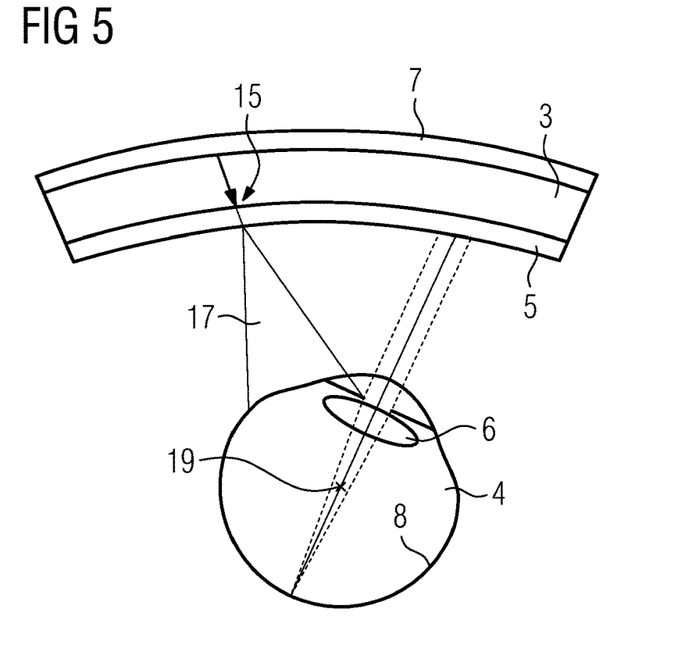
FIG. 5 shows the spectacle lens with the display portion and the illumination direction of FIG. 3 in the case of a rotated eye.
Figure 6:
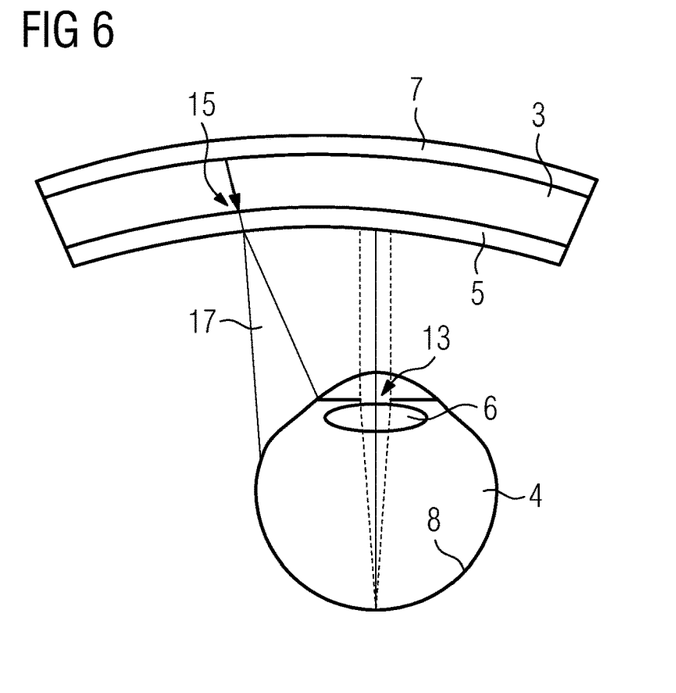
FIG. 6 shows the spectacle lens with the display portion and the illumination direction of FIG. 3 with a laterally displaced eye.

If a picture is presented to the wearer of smartglasses, there is a high probability that said wearer rotates the eye automatically in the direction of the observed image content in order to perceive the relevant image content with the fovea centralis, the point of sharpest vision. Here, there is the risk of image information items from very distant subregions of the display no longer being able to be perceived because the light cone 17 of the wavefront emanating from these subregions no longer reaches the pupil 13 as a result of the rotation of the eye. This problem and the solution thereto are described below with reference to FIGS. 5 to 7. FIG. 5 shows the situation of FIG. 3 when the eye has been rotated about the center of rotation of the eye 19. Even though the light cone 17 would reach the pupil of the eye 13 when the eye looks rigidly straight ahead, said light cone misses the pupil when the eye 4 is rotated, as is schematically clarified in FIG. 5. As a consequence, the wearer only sees a section of the field and therefore can only capture the overall field by way of a scanning motion carried out by the eye 4. The same problem may occur if the eye is laterally displaced from the optimal position relative to the spectacle lens 1, as is shown schematically in FIG. 6. Here, too, the light cone 17 emanating from the subregion 15 misses the pupil 13 of the eye 4. Such a displacement may occur, for example, if use is made of standardized smartglasses which are not adapted to the geometry of the head of the user and the position of the eyes.

Figure 7:
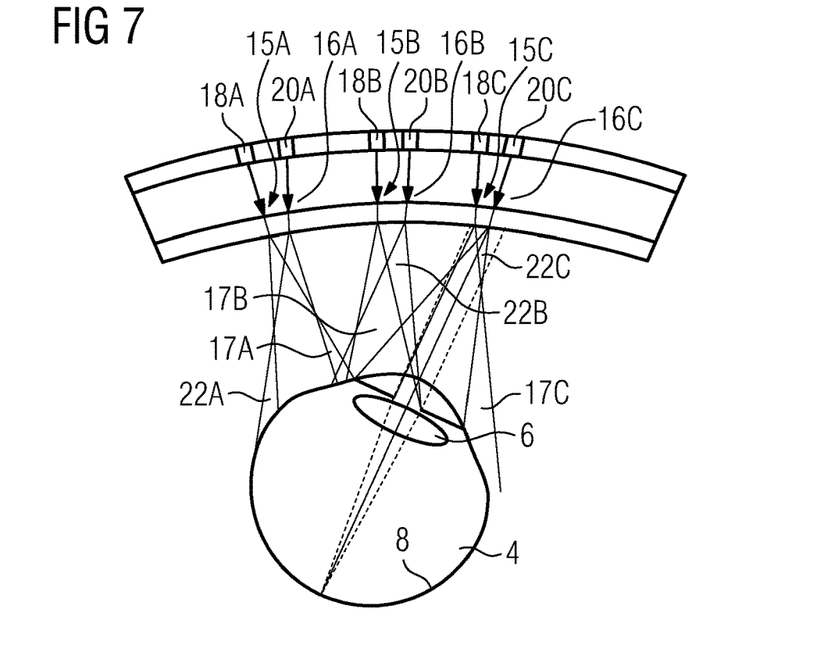
FIG. 7 shows a spectacle lens in which the information items associated with the individual display portions are presented multiple times.

In order to facilitate the perception of the overall field even in the case of a rotational movement of the eye and/or a lateral offset of the eye in relation to the spectacle lens 1, the display and the associated illumination may be segmented, as is illustrated schematically in FIG. 7. Then, the display 5 has groups 15, 16 of display subregions 15A, 15B, 15C, 16A, 16B, 16C, with the display subregions 15A, 15B, 15C, 16A, 16B, 16C of the individual groups 15, 16 alternating on the display 5. Here, each group 15, 16 of display subregions 15A, 15B, 15C, 16A, 16B, 16C generates substantially the same picture. Moreover, the deformation device 7 has groups 18, 20 of deformation device subregions 18A, 18B, 18C, 20A, 20B, 20C, with each of the groups 18, 20 of deformation device subregions 18A, 18B, 18C, 20A, 20B, 20C being associated with a group 15, 16 of display subregions 15A, 15B, 15C, 16A, 16B, 16C. Here, the group 18, 20 of deformation device subregions 18A, 18B, 18C, 20A, 20B, 20C associated with a group 15, 16 of display subregions 15A, 15B, 15C, 16A, 16B, 16C has just as many deformation device subregions 18A, 18B, 18C, 20A, 20B, 20C as the group 15, 16 of display subregions 15A, 15B, 15C, 16A, 16B, 16C, with which it is associated, has display subregions 15A, 15B, 15C, 16A, 16B, 16C. The various groups 18, 20 of deformation device subregions 18A, 18B, 18C, 20A, 20B, 20C deform the wavefront in such a different way that the light cones 17A, 22A, 17B, 22B, 17C, 22C of adjacent display subregions 15A, 16A, 15B, 16B, 15C, 16C, representing the same image information item, of different groups 15, 16 of display subregions 15A, 15B, 15C, 16A, 16B, 16C are directed to different points in space. FIG. 7 shows the illumination directions of the display subregions 15A, 15B, 15C, 16A, 16B, 16C and the directions of the light cones 17A, 17B, 17C, 22A, 22B, 22C emanating from the display subregions 15A, 15B, 15C, 16A, 16B, 16C in exemplary fashion for two groups 15, 16 of display subregions 15A, 15B, 15C, 16A, 16B, 16C and two groups 18, 20 of deformation device subregions 18A, 18B, 18C, 20A, 20B, 20C. Here, the directions in which the light cones 22A, 22B, 22C of the second group 16 of the display subregions 16A, 16B, 15C are emitted are at an angle to the directions in which light cones 17A, 17B, 17C of the first group 15 of the display subregions 15A, 15B, 15C are emitted. In the embodiment variant of the invention illustrated in FIG. 7, the deformation device subregions 18A, 18B, 18C, 20A, 20B, 20C of one group 18, 20 of deformation device subregions 18A, 18B, 18C, 20A, 20B, 20C accordingly deform the wavefront in such a way that it impinges on the display subregion 15A, 15B, 15C, 16A, 16B, 16C of the associated group 15, 16 of display subregions 15A, 15B, 15C, 16A, 16B, 16C at such an angle that the light cones 17A, 17B, 17C, 22A, 22B, 22C emanating from these display subregions 15A, 15B, 15C, 16A, 16B, 16C reach the pupil 13 for a specific rotational position of the eye 4 or a certain lateral displacement of the eye 4. Here, each group 15 of display subregions 15A, 15B, 15C, 16A, 16B, 16C, together with the group 18, 20 of deformation device subregions 18A, 18B, 18C, 20A, 20B, 20C associated therewith, corresponds to a different angle of rotation of the eye 4 or a different lateral offset of the eye 4. What can be realized here by a suitable number of groups 15, 16 of display subregions 15A, 15B, 15C, 16A, 16B, 16C and associated groups 18, 20 of deformation device subregions 18A, 18B, 18C, 20A, 20B, 20C is that the light cone 17, 22 of at least one of the groups 15, 15 of display subregions 15A, 15B, 15C, 16A, 16B, 16C always reaches the pupil 13 for a certain number of rotational angles or lateral offsets of the eye 4.

If display subregions 15A, 15B, 15C, 16A, 16B, 16C that supply the same image information item are arranged in such a way in this configuration that a plurality of display subregions 15A, 15B, 15C, 16A, 16B, 16C simultaneously contribute to the intensity distribution on the retina 8 in each eye position, unwanted intensity variations in the case of coherent illumination, so-called speckles, too, can be reduced by this approach. Here, there is no need for the image information items emanating from the display subregions 15A, 15B, 15C, 16A, 16B, 16C to coherently superpose. A partly coherent/incoherent superposition, as occurs in broadband light sources with a short coherent length, is also conceivable.

Figure 8:
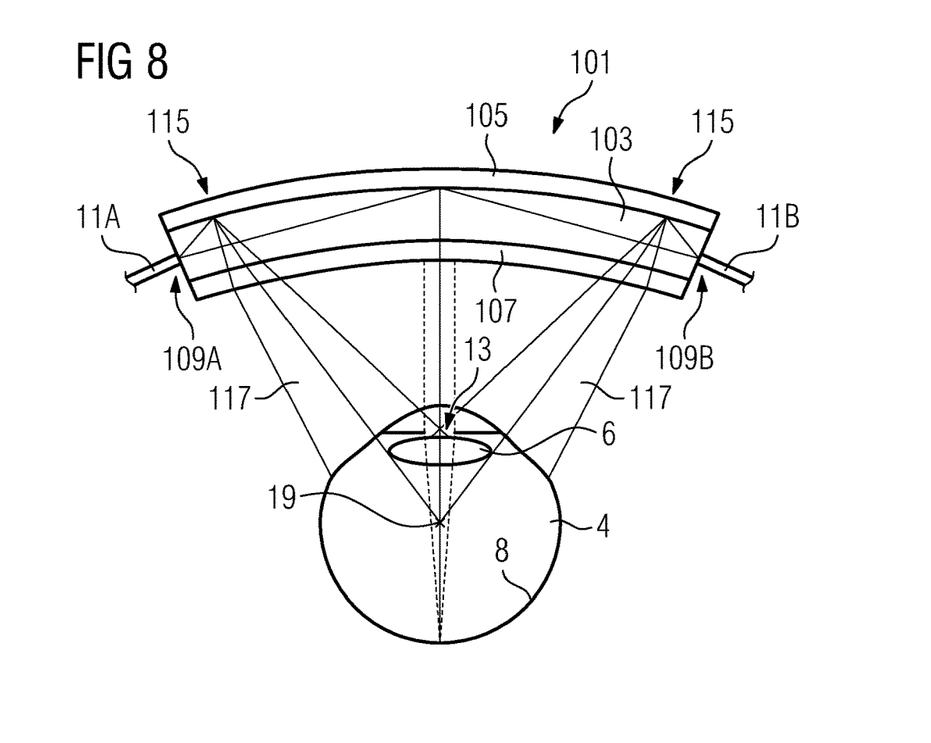
FIG. 8 shows a second exemplary embodiment for a spectacle lens according to the invention, in which the display is arranged on the side of the spectacle lens facing away from the eye and the deformation device is arranged on the side of the spectacle lens facing the eye.

Instead of manipulating the direction of the wavefronts incident on the subregions 15A, 15B, 15C of the display 5 with the deformation device 7, like in the previously described exemplary embodiments and the developments thereof, it is also possible to influence the wavefronts emanating from the display 5 in such a way by a downstream deformation device 107 that aperture cones 117 emanating from subregions 115 reach the pupil 13 of the eye 4. Such an exemplary embodiment is illustrated in FIG. 8. In this example, a display 105 is situated on the outer surface of the main body 103 and illuminated directly by the output ends of the optical fibers 11A, 11B or by light sources arranged on the spectacle lens. Here, the display 105 is embodied as a partly transparent reflective display, which modulates the wavefronts of the illumination radiation and reflects in the direction of the inner surface of the main body 103, on which the deformation element 107 is arranged. Here, the deformation of the wavefront by means of the deformation element 107 is implemented in the exemplary embodiment illustrated in FIG. 8 in such a way that the perpendiculars of the light cones 117 extend through the center of rotation 19 of the eye 4. Deformations which direct the perpendiculars of the light cones 117 onto the eye pupil are also possible. Like in the first exemplary embodiment, groups of display subregions and groups of associated deformation device subregions are also possible in the second exemplary embodiment in order to ensure that the light cone of at least one of the groups of display subregions always reaches the pupil 13 for a certain number of rotational angles or lateral displacements of the eye 4.

If the deformation device 107 is disposed downstream of the display 105, like in the exemplary embodiment of FIG. 8, the deformation device can be realized by a holographic film, microprisms, Fresnel structures, structures with a varying refractive index, etc.

Within the scope of the present invention, it is also possible to illuminate the pixels of the display 5, 105 with convergent or divergent radiation, or to dynamically switch the illumination angles. In both cases, the illumination already spans an angular range that can additionally be modified by the display 5, 105. As result of this, it is possible to generate significantly larger light cones and consequently also possible to enlarge the realizable eyebox and the presentable field.

Figure 13:
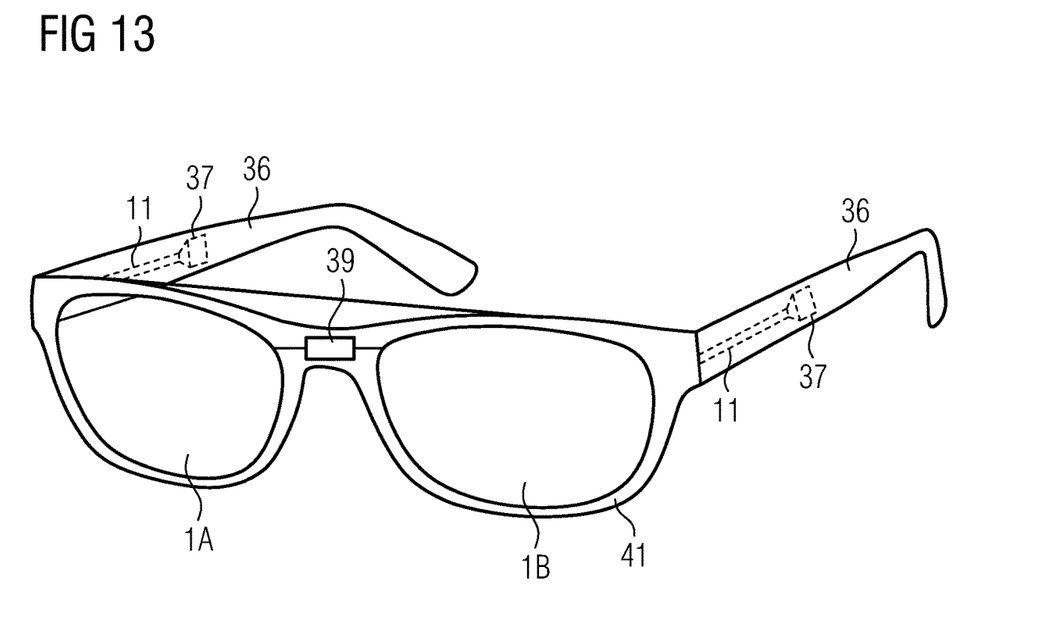
FIG. 13 shows smartglasses according to the invention in a schematic illustration.

Smartglasses with a spectacle lens according to the invention are illustrated schematically in FIG. 13. Both of the two spectacle lenses 1A, 1B are embodied as spectacle lenses according to the invention in this case. The light source emitting coherent light is represented by a laser diode 37 arranged in the spectacle earpiece 36 in the smartglasses illustrated in FIG. 13, the light of said laser diode being guided by means of at least one optical fiber 11 to the input coupling region 9 of the main body 3 of the spectacle lens 1A, 1B. Furthermore, the smartglasses comprise a control unit 39, which is linked to the displays in the spectacle lenses 1A, 1B and which actuates said displays for the purposes of generating the patterns to be represented on the display.

Even though the light sources 37 are integrated into the spectacle earpiece 36 in the smartglasses illustrated in FIG. 13, the solutions for arranging the light sources emitting coherent light that were described in relation to the spectacle lens according to the invention are also possible, i.e., for example, an arrangement of the light sources directly on or in the main body of the spectacle lens. It is likewise possible to arrange the light sources 37 in the spectacle frame 41 instead of in the spectacle earpiece 36. Accordingly, instead of being arranged in the spectacle frame 41 as illustrated in FIG. 13, the control unit 39 can also be arranged in a spectacle earpiece 36 or be divided among both spectacle earpieces 36. Further, an arrangement of the light sources 37 and the control unit 39 in a separate housing, which is connected to the spectacle by way of one or more optical fibers or cables, is also conceivable.

The present invention has been described in detail on the basis of exemplary embodiments for explanatory purposes. As may already be gathered from the description of the exemplary embodiments, developments from the illustrated exemplary embodiments are possible. Therefore, the invention is not intended to be exclusively restricted to individual ones of the illustrated exemplary embodiments, but rather only by the appended claims.

The invention claimed is:

1. A spectacle lens for smartglasses, the spectacle lens comprising:
    a light source that emits coherent light, the light source either arranged at the edge of the spectacle lens or embedded in the spectacle lens or arranged at an input coupling region of the spectacle lens;
    a transparent or partly transparent display arranged on or in the spectacle lens such that coherent light emanating from the light source passes through the display, the display configured such that a wavefront of the coherent light passing through the display is modulable in terms of one or both of its amplitude and its phase by an actuation of the display; and
    a deformation device for deforming the wavefront of the coherent light before or after the modulation by the display where the deformation device comprises a ply with a holographic optical film or a gradient index layer,
    wherein the light source that emits coherent light comprises at least two light elements with different emission wavelengths or wherein the light source is tunable in terms of its emission wavelength or wherein the light source simultaneously emits light in a plurality of emission wavelengths, and
    wherein the deformation device is subdivided into at least two deformation segment groups, wherein the segments of a deformation segment group differ from the segments of the respective other deformation segment groups in that they bring about a deformation of the wavefront in different emission wavelengths, and wherein the segments of the deformation segment groups are distributed in alternating lateral fashion in the deformation device.

2. The spectacle lens of claim 1,
    wherein the transparent or partly transparent display includes groups of display subregions,
    wherein the display subregions of the individual groups are arranged over the display with an alternating lateral distribution and each group of display subregions generates the same picture,
    wherein the deformation device for deforming the wavefront of the coherent light comprises groups of deformation device subregions that are arranged over the deformation device with an alternating lateral distribution, before or after the modulation,
    wherein each of the groups of deformation device subregions is associated with a group of display subregions, and
    wherein the groups of deformation device subregions deform the wavefront such that light cones of adjacent display subregions, representing the same image information item, of different groups of display subregions are directed to different points in space.

3. The spectacle lens of claim 1,
    wherein the transparent or partly transparent display includes groups of display subregions,
    wherein the display subregions of the individual groups are arranged over the display with an alternating lateral distribution and each group of display subregions generates the same picture,
    wherein the deformation device for deforming the wavefront of the coherent light comprises a number of deformation layers before or after the modulation, and
    wherein each deformation layer is associated with one of the groups of display subregions.

4. The spectacle lens of claim 1, wherein the display has comprises a number of display layers, in which light cones emanating from the individual display layers are directed to different points in space, and the deformation device comprises a number of deformation layers before or after the modulation, and wherein one of the display layers is associated with each deformation layer.

5. The spectacle lens of claim 1, wherein the spectacle lens comprises a spectacle lens curvature and the transparent or partly transparent display comprises a display curvature that is matched to the spectacle lens curvature.

6. The spectacle lens of claim 1, wherein the transparent or partly transparent display is embedded in the spectacle lens.

7. The spectacle lens of claim 1, wherein the transparent or partly transparent display is partly transparent and includes non-transparent regions, wherein dimensions of the non-transparent regions are smaller than a minimum pupil diameter of a user's eye and the non-transparent regions are separated from one another by transparent regions.

8. The spectacle lens of claim 1, wherein the pixels of the transparent or partly transparent display have dimensions of no more than 7.5 µm.

9. The spectacle lens of claim 1, further comprising an optical device that produces a divergent or a convergent beam path or that dynamically switches the illumination angle at which the display is illuminated.

10. The spectacle lens of claim 1, further comprising a polarizer that polarizes the coherent light emanating from the light source arrangement that emits coherent light.

11. The spectacle lens of claim 1, further comprising a device for coupling the individual emission wavelengths into the spectacle lens in parallel.

12. The spectacle lens of claim 1, wherein the deformation device comprises at least two deformation layers, which each bring about a deformation of the wavefront in the different emission wavelengths.

13. The spectacle lens of claim 1, further comprising a device for coupling the individual emission wavelengths into the spectacle lens in time-sequential fashion.

14. A pair of smartglasses, comprising at least one spectacle lens according to claim 1.

15. The smartglasses of claim 14, wherein the light source is arranged external to a main body of the spectacle lens, the smartglasses further comprising a device for producing a divergent or a convergent beam path or for dynamically switching an illumination angle of light produced by the light source.

16. The smartglasses of claim 14, wherein the light source is arranged external to a main body of the spectacle lens, the smartglasses further comprising polarizer that polarizes the coherent light emanating from the light source.

17. The smartglasses as claimed in claim 14, wherein the light source is arranged external to a main body of the spectacle lens, the smartglasses further comprising at least two light sources, each with different emission wavelengths or wherein the light source is tunable in terms of its emission wavelength or wherein the light source simultaneously emits in a plurality of emission wavelengths.

18. A method for generating a picture on the retina of an eye of a person wearing smartglasses, the method comprising:
    donning by the person the smartglasses according to claim 14;
    positioning a display outside of a plane that is optically conjugate to the retina of the person wearing the smartglasses;
    actuating the display such that the wavefront of the coherent light emanating from the light source backward propagates immediately behind the display toward the location of the retina; and
    deforming the wavefront such that a light cone emanating from a pixel is either directed or deflected to a point on or in the eye.

19. The method of claim 18, wherein the display is actuated such that the wavefront arising behind the display has light cones that are each inclined in a specified direction.

20. The method of claim 19, wherein the specified direction varies over time.

21. The method of claim 19, further comprising:
    capturing a viewing direction of the eye; and
    matching the specified direction to the viewing direction of the eye.

22. A spectacle lens for smartglasses, the spectacle lens comprising:
    a light source that emits coherent light, the light source either arranged at the edge of the spectacle lens or embedded in the spectacle lens or arranged at an input coupling region of the spectacle lens;
    a transparent or partly transparent display arranged on or in the spectacle lens such that coherent light emanating from the light source passes through the display or is reflected by the display, the display configured such that the wavefront of the coherent light is modulable in terms of one or both of its amplitude and its phase by an actuation of the display; and
    a deformation device for deforming the wavefront of the coherent light before or after the modulation by the display,
    wherein the transparent or partly transparent display includes groups of display subregions,
    wherein the display subregions of the individual groups are arranged over the display with an alternating lateral distribution and each group of display subregions generates the same picture, and
        wherein the deformation device for deforming the wavefront of the coherent light comprises groups of deformation device subregions that are arranged over the deformation device with an alternating lateral distribution, before or after the modulation,
        wherein each of the groups of deformation device subregions is associated with a group of display subregions, and
        wherein the groups of deformation device subregions deform the wavefront such that light cones of adjacent display subregions, representing the same image information item, of different groups of display subregions are directed to different points in space,
    or
        wherein the deformation device for deforming the wavefront of the coherent light comprises a number of deformation layers before or after the modulation, and
        wherein each deformation layer is associated with one of the groups of display subregions.

23. A pair of smartglasses, comprising at least one spectacle lens according to claim 22.

24. The smartglasses of claim 23, wherein the light source is arranged external to a main body of the spectacle lens, the smartglasses further comprising a device for producing a divergent or a convergent beam path or for dynamically switching an illumination angle of light produced by the light source.

25. The smartglasses of claim 23, wherein the light source is arranged external to a main body of the spectacle lens, the smartglasses further comprising polarizer that polarizes the coherent light emanating from the light source.

26. The smartglasses as claimed in claim 23, wherein the light source is arranged external to a main body of the spectacle lens, the smartglasses further comprising at least two light sources, each with different emission wavelengths or wherein the light source is tunable in terms of its emission wavelength or wherein the light source simultaneously emits in a plurality of emission wavelengths.

27. A method for generating a picture on the retina of an eye of a person wearing the smartglasses according to claim 23, the method comprising:
    donning by the person the smartglasses according to claim 23;
    positioning a display outside of a plane that is optically conjugate to the retina of the person wearing the smartglasses;
    actuating the display such that the wavefront of the coherent light emanating from the light source backward propagates immediately behind the display toward the location of the retina; and deforming the wavefront such that a light cone emanating from a pixel is either directed or deflected to a point on or in the eye.

\* \* \* \* \*